(12) United States Patent
Nagata et al.

(10) Patent No.: US 8,971,436 B2
(45) Date of Patent: Mar. 3, 2015

(54) USER EQUIPMENT AND CHANNEL STATE INFORMATION FEEDBACK METHOD

(75) Inventors: Satoshi Nagata, Tokyo (JP); Yoshihisa Kishiyama, Tokyo (JP); Xiang Yun, Tokyo (JP); Jianchi Zhu, Tokyo (JP); Xiaoming She, Tokyo (JP); Lan Chen, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 73 days.

(21) Appl. No.: 13/703,913

(22) PCT Filed: Jun. 17, 2011

(86) PCT No.: PCT/JP2011/063956
§ 371 (c)(1),
(2), (4) Date: Jan. 16, 2013

(87) PCT Pub. No.: WO2011/158943
PCT Pub. Date: Dec. 22, 2011

(65) Prior Publication Data
US 2013/0114751 A1 May 9, 2013

(30) Foreign Application Priority Data
Jun. 17, 2010 (CN) .......................... 2010 1 0204762

(51) Int. Cl.
*H04B 7/02* (2006.01)
*H04B 7/04* (2006.01)
(Continued)

(52) U.S. Cl.
CPC .............. *H04B 7/0478* (2013.01); *H04B 7/024* (2013.01); *H04B 7/0456* (2013.01);
(Continued)

(58) Field of Classification Search
CPC .... H04B 7/024; H04B 7/0417; H04B 7/0456; H04B 7/0632; H04B 7/0634; H04B 7/0482; H04L 5/0035

USPC .............. 375/267, 295, 358; 370/252; 455/69
See application file for complete search history.

(56) References Cited

U.S. PATENT DOCUMENTS 8,379,705 B2 * 2/2013 Mallik et al. .................. 375/226
8,649,456 B2 * 2/2014 Xia et al. ...................... 375/267
(Continued)

OTHER PUBLICATIONS

R1-091455, "Hierarchical feedback in support of downlink CoMP operation", 3GPP TSG-RAN WG1 #56bis, Mar. 23-27, 2009, pp. 1-4.*
(Continued)

*Primary Examiner* — Sophia Vlahos
(74) *Attorney, Agent, or Firm* — Osha Liang LLP

(57) ABSTRACT

The present invention provides a user equipment and channel state information feedback method. The channel state information feedback method used in a coordinated multi-point system includes acquiring small-scale channel state information $H'=[H'_1, H'_2, \ldots, H'_K]$ between a user equipment and all base stations joining coordination, acquiring large-scale channel state information $l_i (i=1, \ldots, K)$ between the user equipment and each of the base stations joining coordination, acquiring a CQI ($CQI_i=l_i\blacksquare|H'|$, $i=1, \ldots, K$) between the user equipment and each of the base stations joining coordination based on the small-scale channel state information and the large-scale channel state information, updating the source codebook C using the acquired CQI to acquire an updated codebook $\tilde{C}$, performing quantization processing using the updated codebook to acquire CDI, and transmitting the CDI and the CQI associated with each of the base stations joining coordination to a base station as feedback to provide for channel reconstruction in the base station. According to the invention, the rate of utilization of feedback information is improved.

6 Claims, 2 Drawing Sheets

(51) Int. Cl.
*H04B 7/06* (2006.01)
*H04L 1/00* (2006.01)
*H04L 5/00* (2006.01)

(52) U.S. Cl.
CPC .......... *H04B 7/0632* (2013.01); *H04L 1/0015* (2013.01); *H04L 1/0026* (2013.01); *H04L 1/0031* (2013.01); *H04L 5/0035* (2013.01)
USPC .......... 375/267; 375/295; 375/358; 370/252; 455/69

(56) References Cited

U.S. PATENT DOCUMENTS 8,675,627 B2 * 3/2014 Xia et al. .................. 370/342
8,837,619 B2 * 9/2014 Shin et al. ................. 375/267
2011/0103493 A1 * 5/2011 Xia et al. .................. 375/259

OTHER PUBLICATIONS

R1-101062 Feedback of Long Term Channel Information for Adaptive Codebook:, 3GPP TSG RAN WG1#60, Feb. 22-26, 2010, pp. 1-5.*

Decision to Grant issued in counterpart Japanese national phase application No. 2012520511 mailed Feb. 18, 2014 (4 pages).

* cited by examiner

USER EQUIPMENT AND CHANNEL STATE INFORMATION FEEDBACK METHOD

TECHNICAL FIELD

The present invention relates to the radio mobile communication field, and more particularly, to user equipment and channel state information feedback method.

BACKGROUND ART

In Frequency Division Duplex (FDD), a user needs to transmit channel state information to the base station side in the form of CDI (Channel Direction Information) and CQI (Channel Quality Information) as feedback, and the base station side reconstructs the channel using the CDI and CQI transmitted as feedback, and based on the reconstructed channel, performs precoding and the like to perform downlink transmission.

In a multi-antenna MIMO system, a user needs to transmit the channel state information to a single base station as feedback, and each state information includes large-scale channel state information and small-scale channel state information. The large-scale channel state information is mainly determined by a relative position between the user and the base station. Meanwhile, the small-scale channel state information indicates attenuation status between antennas of the base station and the user, and each element meets complex Gaussian probability variable with the average of "0" and variance of "1".

Meanwhile, in a Coordinated Multi-Point (COMP) system, a user needs to transmit a plurality of channel state information of a plurality of base stations as feedback. Assuming that K coordinated points perform coordinated multi-point transmission/reception, the user needs to transmit the following channel state information of a plurality of base stations as feedback.

$$H=[l_1 H'_1, l_2 H'_2, \ldots, l_K H'_K]$$

In addition, $l_i$, $i=1, \ldots, K$ represents large-scale channel state information of an ith base station, and H, $i=1, \ldots, K$ represents small-scale channel state information of the ith base station.

As an example in conventional techniques, in a channel state information feedback method of the Coordinated Multi-Point (COMP) system, assuming that K base stations join the coordination, a codebook is expressed by the following equation.

$$C=\{C_i\}, i=1, \ldots, 2^N$$

In addition, $C_i$ represents an ith codeword in the codebook, the codeword $C_i$ includes quantization information respectively associated with K coordination joining base stations, and $C_i$ can be expressed by $C_i=[C_{i,1}, \ldots, C_{i,k}]$. N is the number of bits transmitted as feedback.

In the method, joint quantization is performed on the channel state information of multi-cell using a codebook C of a relatively large order, and the processing on the client side includes the following first to fifth steps.

In the 1st step, extracted is $H'=[H'_1, H'_2, \ldots, H'_K]$ that is small-scale channel state information of multi-point.

In the 2nd step, extracted is $l_i$, $i=1, \ldots, K$ that is large-scale channel state information of multi-point.

In the 3rd step, acquired is CQI information ($CQI_i=l_i \cdot |H'|$) of multi-point, in which · represents a dot product.

In the 4th step, the small-scale channel state information of multi-point is quantized using the large codebook to acquire CDI information. The rule of quantization is expressed by the following equation.

$$CDI = \arg \max_{1 \leq j \leq 2^N} \frac{|C_j \cdot H'^H|}{|C_j| \cdot |H'^H|}$$

In the 5th step, a plurality of CQIs and a single piece of CDI information is transmitted as feedback, and a channel to reconstruct in the base station is expressed by the following equation.

$$\hat{H}=[CQI_1 \cdot C_{CDI,1}, \ldots, CQI_K \cdot C_{CDI,K}]$$

As another example, the channel state information feedback method of the Coordinated Multi-Point (COMP) system is actualized by joint quantization of multi-cell based on the large codebook, and the processing flow on the user equipment side includes the following first to fifth steps.

In the 1st step, extracted is $H'=[H'_1, H'_2, \ldots, H'_K]$ that is small-scale channel state information of multi-point.

In the 2nd step, extracted is $l_i$, $i=1, \ldots, K$ that is large-scale channel state information of multi-point.

In the 3rd step, acquired is CQI information ($CQI_i=l_i \cdot |H'|$) of multi-point.

In the 4th step, complete channel state information of multi-point is quantized using the large codebook to acquire CDI information. The rule of quantization is expressed by the following equation.

$$CDI = \arg \max_{1 \leq j \leq 2^N} \frac{|C_j \cdot H^H|}{|C_j| \cdot |H^H|}$$

In the 5th step, a plurality of CQIs and a single piece of CDI information is transmitted as feedback, and a channel to reconstruct in the base station is expressed by the following equation.

$$\hat{H}=[CQI_1 \cdot C_{CDI,1}, \ldots, CQI_K \cdot C_{CDI,K}]$$

Further, as another example, in the channel state information feedback method of the Coordinated Multi-Point (COMP) system, quantization is performed independently for each cell based on a small codebook. It is assumed that the codebook is expressed by the following equation.

$$C'=\{C'_i\}, i=1, \ldots, 2^N$$

In addition, $C'_i$ represents an ith codeword in the codebook, N is the number of bits transmitted as feedback, and the selected $C'_i$ is associated with quantization information of any one of base stations. In the method, the channel state information of each cell is quantized independently using a codebook C' of a small order, phase information of a plurality of cells is then quantized, and by combining, the channel state information of a plurality of cells is obtained. It is assumed that the codebook to quantize the phase information is expressed by the following equation.

$$D=\{D_j\}, j=1, \ldots, 2^M$$

In addition, $D_j$ is complex expression of a phase angle to quantize, and is expressed as follows:

$$D_j = \exp\left(\frac{sqrt(-1)^* j 2\pi}{2^M}\right), j=1,\ldots,2^M$$

M is the number of bits required to quantize the phase angle.

In the channel state information feedback method for performing quantization independently for each cell based on the small codebook, the processing flow on the user equipment side includes the first to eighth steps as described below.

In the 1st step, extracted is $H'=[H'_1, H'_2, \ldots H'_K]$ that is small-scale channel state information of multi-point.

In the 2nd step, extracted is $l_i$, $i=1,\ldots,K$ that is large-scale channel state information of multi-point.

In the 3rd step, acquired is CQI information ($CQI_i = l_i \cdot |H'_i|$) of multi-point.

In the 4th step, the small-scale channel state information of each cell is quantized using the small codebook to acquire CDI information. The rule of quantization is expressed by the following equation.

$$CDI_i = \arg\max_{1 \le j \le 2^N} \frac{|C_j \cdot H_i'^H|}{|C_j| \cdot |H_i'^H|}, i=1,\ldots,K$$

In the 5th step, the multi-base station phase information is defined as $G=[g_1, \ldots, g_K]$, the codebook is quantized based on the phase, and the following quantization phase set candidates are combined.

$$G' = [D_{1,j_1}, \ldots, D_{K,j_K}], j_k = 1, \ldots, 2^M, k=1, \ldots, K$$

It is understood that the aforementioned quantization phase set G' has $2^{MK}$ kinds of combinations.

In the 6th step, a channel is reconstructed using the CQI, CDI and quantization phase set candidates of multi-cell, and the reconstructed channel is expressed by the following equation.

$$\hat{H} = [D_{1,j_1} \cdot CQI_1 \cdot C_{CDI_1}, \ldots, D_{K,j_K} \cdot CQI_K \cdot C_{CDI_K}]$$

In the 7th step, the reconstructed channel is compared with the complete channel state information of multi-cell, and the quantization information IPI (Inter-cell Phase Index) of multi-cell phase is acquired by an inclusive search. The rule of the search is expressed by the following equation.

$$IPI = \arg\max_{1 \le j \le 2^{MK}} \frac{|\hat{H}_j \cdot H^H|}{|\hat{H}_j| \cdot |H^H|}$$

The phase index associated with each cell is expressed by the following equation.

$$IPI_i, i=1, \ldots, K$$

In the 8th step, the CQI, CDI and multi-base station phase information is transmitted as feedback, and using the CQI, CDI and multi-base station phase information transmitted as feedback, the base station side reconstructs the following multi-point channel.

$$\hat{H} = [D_{IPI_1} \cdot CQI_1 \cdot C'_{CDI_1}, \ldots, D_{IPI_K} \cdot CQI_K \cdot C'_{CDI_K}]$$

In each of above-mentioned methods, there is a problem that system throughput performance gain by a unit feedback amount is not high in any of the methods.

SUMMARY OF THE INVENTION

Technical Problem

It is an object of the present invention to provide a user equipment and channel state information feedback method for enabling throughput performance of a system to be increased.

Solution to Problem

To attain the above-mentioned object, Embodiments of the present invention provide a channel state information feedback method used in a coordinated multi-point system, in the coordinated multi-point system the number of base stations joining coordination is represented by K and a source codebook is expressed by $C=\{C_i\}$ ($i=1,\ldots,2^N$, $C_i=[C_{i,1},\ldots,C_{i,K}]$, N: the number of bits transmitted as feedback), and the channel state information feedback method includes a user equipment acquiring small-scale channel state information $H'=[H'_1, H'_2, \ldots, H'_K]$ between the user equipment and all base stations joining coordination, the user equipment acquiring large-scale channel state information $l_i$ ($i=1,\ldots,K$) between the user equipment and each of the base stations joining coordination, the user equipment acquiring a CQI ($CQI_i = l_i \cdot |H'_i|$, $i=1,\ldots,K$) between the user equipment and each of the base stations joining coordination, based on the small-scale channel state information and the large-scale channel state information, the user equipment updating the source codebook C using the acquired CQI to acquire an updated codebook $\tilde{C}$, the user equipment performing quantization processing using the updated codebook to acquire CDI, and the user equipment transmitting the CDI and the CQI associated with each of the base stations joining coordination to a base station as feedback to provide for channel reconstruction in the base station.

In the above-mentioned channel state information feedback method, the updated codebook $\tilde{C}$ is expressed by the following equation.

$$\tilde{C} = \{\tilde{C}_i\} = \{[CQI_1 \cdot C_{i,1}, \ldots CQI_K \cdot C_{i,K}]\}, i=1, \ldots, 2^N$$

In the above-mentioned channel state information feedback method, the user equipment performing quantization processing using the updated codebook to acquire CDI is that the user equipment performs quantization processing on the above-mentioned H' using the updated codebook to acquire the CDI, or that the user equipment performs quantization processing on complete channel state information $H=[l_1H'_1, l_2H'_2, \ldots, l_KH'_K]$ using the updated codebook to acquire the CDI.

To attain the above-mentioned object, Embodiments of the invention further provide a user equipment used in a coordinated multi-point system, in the coordinated multi-point system the number of base stations joining coordination is represented by K and a source codebook is expressed by $C=\{C_i\}$ ($i=1, \ldots, 2^N$, $C_i=[C_{i,1}, \ldots, C_{i,K}]$, N: the number of bits transmitted as feedback), and the user equipment includes a first radio communication module, a first acquisition module to acquire small-scale channel state information $H'=[H'_1, H'_2, \ldots, H'_K]$ between the user equipment and all base stations joining coordination, a second acquisition module to acquire large-scale channel state information between the user equipment and each of the base stations joining coordination, a third acquisition module to acquire a CQI ($CQI_i = l_i \cdot |H'_i|$, $i=1, \ldots, K$) between the user equipment and each of the base stations joining coordination, an update module to update the source codebook C using the acquired CQI to acquire an updated codebook $\tilde{C}$, a first quantization module to perform quantization processing using the updated codebook to acquire CDI, and a first feedback module to transmit the CDI and the CQI associated with each of the base stations joining coordination to a base station as feedback using the first radio communication module to provide for channel reconstruction in the base station.

In the above-mentioned user equipment, the updated codebook
$\tilde{C}$
is expressed by the following equation.
$\tilde{C} = \{\tilde{C}_i\} = \{[CQI_1 \cdot C_{i,1}, \ldots, CQI_K \cdot C_{i,K}]\}$, $i=1, \ldots, 2^N$ In the above-mentioned user equipment, the quantization module performs quantization processing on the above-mentioned H' using the updated codebook to acquire the CDI, or performs quantization processing on complete channel state information $H=[l_1 H'_1, l_2 H'_2, \ldots, l_K H'_K]$ using the updated codebook to acquire the CDI.

To attain the above-mentioned object, Embodiments of the invention provide a channel state information feedback method used in a coordinated multi-point system, in the coordinated multi-point system the number of base stations joining coordination is represented by K and a small-scale codebook is expressed by $C'=\{C'_i\}$ ($i=1, \ldots, 2^N$, $C'_i$: ith codeword in the codebook, N: the number of bits transmitted as feedback), and the channel state information feedback method includes a user equipment acquiring small-scale channel state information $H'=[H'_1, H'_2, \ldots, H'_K]$ between the user equipment and all base stations joining coordination, the user equipment acquiring large-scale channel state information $l_i$ ($i=1, \ldots, K$) between the user equipment and each of the base stations joining coordination, the user equipment acquiring a CQI ($CQI_i = l_i \cdot |H'|$, $i=1, \ldots, K$) between the user equipment and each of the base stations joining coordination, based on the small-scale channel state information and the large-scale channel state information, the user equipment performing quantization on the channel state information of each of the base stations joining coordination using the small codebook C' to acquire CDI information associated with each of the base stations joining coordination, the user equipment calculating multi-base station phase information $G=[g_1, \ldots, g_K]$, the user equipment calculating inter-base station difference phase information $G'=\{g'_i\}$ ($g'_i = g_i / g_x$, $i=1, \ldots, K$, $i \neq x$, $g_x$: one element in the multi-base station phase information G) the user equipment performing quantization on the inter-base station difference phase information G' using a phase information quantization codebook D to acquire IPI, and the user equipment transmitting the acquired IPI, the CQI associated with each of the base stations joining coordination and the CDI as feedback to provide for multi-point channel reconstruction in the base station.

In the above-mentioned channel state information feedback method, the user equipment performs quantization on the small-scale channel state information of each of the base stations joining coordination or complete channel state information, using the small codebook C', and acquires CDI information associated with each of the base stations joining coordination.

In the above-mentioned channel state information feedback method, the IPI acquired by the user equipment performing quantization on the inter-base station difference phase information G' using the phase information quantization codebook D is expressed by the following equation.

$$IPI_i = \arg\max_{1 \le j \le 2^M} \frac{|g'_i \cdot D_j^H|}{|g'_i| \cdot |D_j^H|}, i=1, \ldots, K, i \neq \chi$$

In addition, $D_j$: element in the inter-base station difference phase information quantization codebook D, $j=1, \ldots, 2^M$, M: the number of bits required for quantization of the inter-base station difference phase information, and a multi-point channel reconstructed by the base station is expressed by $$\hat{H} = [\ldots, D_{IPI_{x-1}} \cdot CQI_{x-1} \cdot C_{CDI_{x-1}}, CQI_x \cdot C_{CDI_x}, D_{IPI_{x+1}} \cdot CQI_{x+1} \cdot C_{CDI_{x+1}}, \ldots].$$

To attain the above-mentioned object, Embodiments of the invention further provide a user equipment used in a coordinated multi-point system, in the coordinated multi-point system the number of base stations joining coordination is represented by K and a small-scale codebook is expressed by $C'=\{C'_i\}$ ($i=1, \ldots, 2^N$, $C'_i$: ith codeword in the codebook, N: the number of bits transmitted as feedback), and the user equipment includes a first radio communication module, a first acquisition module to acquire small-scale channel state information $H'=[H'_1, H'_2, \ldots, H'_K]$ between the user equipment and all base stations joining coordination, a second acquisition module to acquire large-scale channel state information $l_i$ ($i=1, \ldots, K$) between the user equipment and each of the base stations joining coordination, a third acquisition module to acquire a CQI ($CQI_i = l_i \cdot |H'|$, $i=1, \ldots, K$) between the user equipment and each of the base stations joining coordination, based on the small-scale channel state information and the large-scale channel state information, a second quantization module to perform quantization on the channel state information of each of the base stations joining coordination using the small codebook C' to acquire CDI information, a fourth acquisition module to calculate multi-base station phase information $G=[g_1, \ldots, g_K]$, a fifth acquisition module to calculate inter-base station difference phase information $G'=\{g'_i\}$ ($g'_i = g_i / g_x$, $i=1, \ldots, K$, $i \neq x$, $g_x$: one element in the multi-base station phase information G) based on multi-base station phase information G, a third quantization module to perform quantization processing on the inter-base station difference phase information G' using a phase information quantization codebook D to acquire IPI, and a second feedback module to transmit the acquired IPI, the CQI associated with each of the base stations joining coordination and the CDI as feedback using the first radio communication module to provide for multi-point channel reconstruction in the base station.

In the above-mentioned user equipment, the second quantization module performs quantization on the small-scale channel state information of each of the base stations joining coordination or complete channel state information, using the small codebook C', and acquires CDI information associated with each of the base stations joining coordination.

In the above-mentioned user equipment, the above-mentioned IPI is expressed by the following equation.

$$IPI_i = \arg\max_{1 \le j \le 2^M} \frac{|g'_i \cdot D_j^H|}{|g'_i| \cdot |D_j^H|}, i=1, \ldots, K, i \neq \chi$$

In addition, $D_j$: element in the inter-base station difference phase information quantization codebook D, $j=1, \ldots, 2^M$, M: the number of bits required for quantization of the inter-base station difference phase information, and a multi-point channel reconstructed by the base station is expressed by $$\hat{H}=[\ldots,D_{IPI_{x-1}}\cdot CQI_{x-1}\cdot C_{CDI_{x-1}},CQI_x\cdot C_{CDI_x},$$
$$D_{IPI_{x+1}}\cdot CQI_{x+1}\cdot C_{CDI_{x+1}},\ldots]$$

Technical Advantages of the Invention

According to the Embodiments of the invention the following useful effects are obtained.

In the invention, in the case of performing feedback using the large codebook, the quantization processing is performed using the CQI-updated codebook to acquire the CDI, and throughput of the user is thereby increased, without increasing feedback overhead. In the case of performing feedback using the small codebook, feedback is performed using the difference phase, and feedback overhead is thereby reduced without decreasing throughput of the user. On the whole, two kinds of methods both improve the rate of utilization of feedback information.

DESCRIPTION OF EMBODIMENTS

To more understand the present invention, before specifically describing Embodiments of the invention, pertinent parameters and concepts will be described first.

In a Coordinated Multi-Point (COMP) system, a user needs to transmit a plurality of channel state information of a plurality of base stations as feedback, and it is assumed that K coordinated multi-points perform coordinated multi-point transmission/reception, and that the channel state information of a plurality of base stations having the need of feedback by the user is as described below.

$$H=[l_1H'_1, l_2H'_2, \ldots, l_KH'_K]$$

In any base station among the plurality of base stations, small-scale channel state information thereof is expressed by the following equation.

$$\begin{bmatrix} h'_{1,1} & \cdots & h'_{1,N_T} \\ \vdots & \ddots & \vdots \\ h'_{N_R,1} & \cdots & h'_{N_R,N_T} \end{bmatrix}$$

In addition,
$N_T$: the number of transmission antennas of the base station;
$N_R$: the number of reception antennas of a user equipment; and
$h'_{ij}$, $i=1,\ldots,N_R$, $j=1,\ldots,N_T$: channel station information of from a jth transmission antenna to an ith reception antenna.

The channel state information feedback method of Embodiment 1 of the invention is used in a coordinated multi-point system. In the coordinated multi-point system, the number of base stations joining coordination is K, and a source codebook is expressed by the following equation.

$$C=\{C_i\}, i=1,\ldots,2^N$$

In addition, $C_i=[C_{i,1},\ldots C_{i,K}]$.

Figure 1:
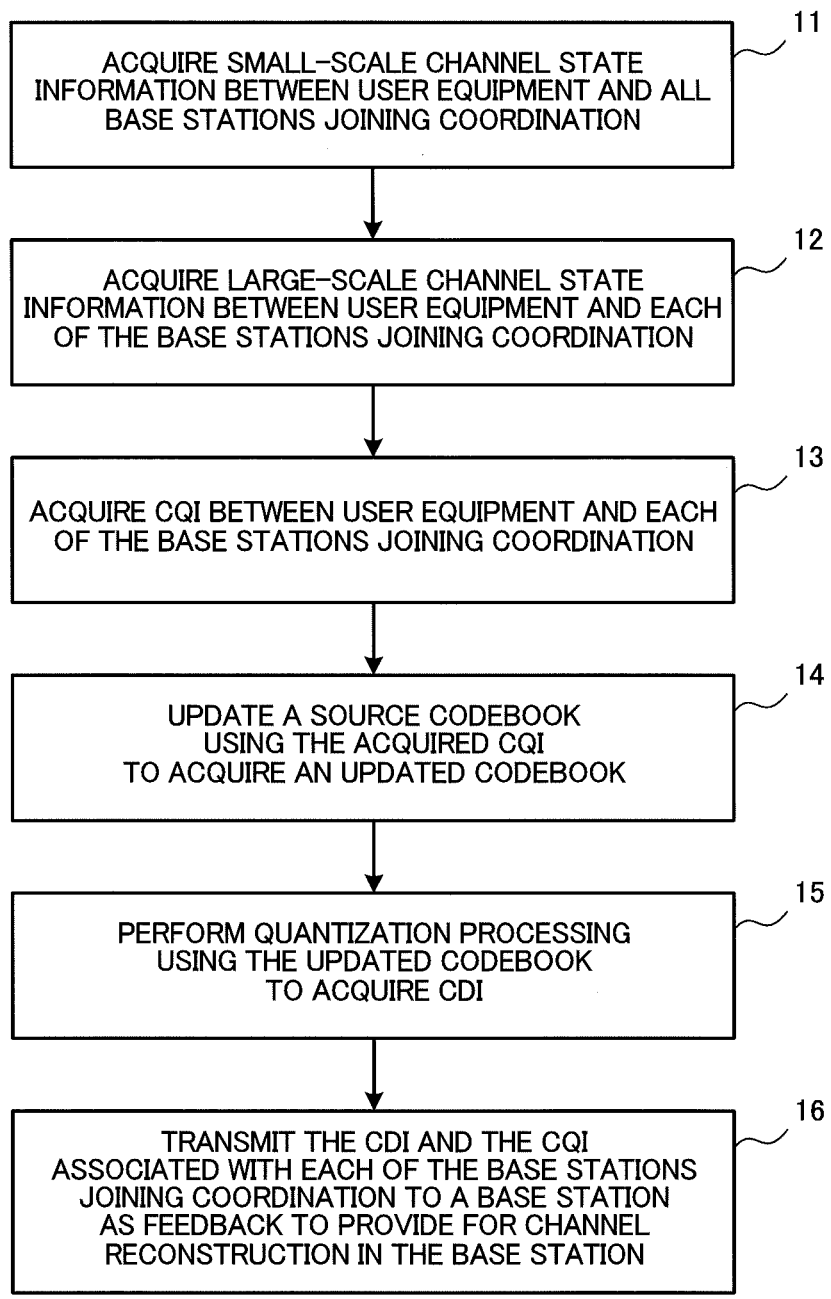
FIG. 1 is a flow diagram of a channel state information feedback method of Embodiment 1 of the invention.

As shown in FIG. 1, the above-mentioned channel state information feedback method includes following steps 11 to 16.

In step 11, the user equipment acquires small-scale channel state information $H'=[H'_1, H'_2, \ldots, H'_K]$ between the user equipment and all base stations joining coordination.

In step 12, the user equipment acquires large-scale channel state information $l_i (i=1,\ldots,K)$ between the user equipment and each of the base stations joining coordination.

In step 13, the user equipment acquires a CQI between the user equipment and each of the base stations joining coordination.

$$CQI_i = l_i \cdot |H'_i|, i=1,\ldots,K$$

In step 14, the user equipment updates the source codebook C using the acquired CQI, and acquires an updated codebook $\tilde{C}$.

$$\tilde{C}=\{\tilde{C}_i\}=\{[CQI_1\cdot C_{i,1},\ldots CQI_K\cdot C_{i,K}]\}, i=1,\ldots,2^N$$

In step 15, the user equipment performs quantization processing using the updated codebook to acquire CDI.

In step 16, the user equipment transmits the CDI and the CQI associated with each of the base stations joining coordination to a base station as feedback to provide for channel reconstruction in the base station.

In the specific Embodiment of the invention, it is possible to calculate the CDI using following schemes in above-mentioned step 15.

Scheme 1 The small-scale channel state information is a subject of quantization.

In the case of scheme 1, step 15 is specifically performed as described below.

The user equipment performs quantization processing on the small-scale channel state information H' using the updated codebook to acquire the CDI.

$$CDI = \arg\max_{1\le j\le 2^N} \frac{|\tilde{C}_j \cdot H'^H|}{|\tilde{C}_j|\cdot|H'^H|}$$

The channel reconstructed by the base station is expressed by the following equation.

$$\hat{H}=[CQI_1\cdot C_{CDI,1},\ldots,CQI_K\cdot C_{CDI,K}]$$

Scheme 2 The complete channel state information is a subject of quantization.

In the case of scheme 2, step 15 is specifically performed as described below.

The user equipment performs quantization processing on the complete channel state information $H=[l_1H'_1, l_2H'_2, \ldots, l_KH'_K]$ using the updated codebook to acquire the CDI.

$$CDI = \arg\max_{1\le j\le 2^N} \frac{|\tilde{C}_j \cdot H^H|}{|\tilde{C}_j|\cdot|H^H|}$$

The channel reconstructed by the base station is expressed by the following equation.

$$\hat{H}=[CQI_1\cdot C_{CDI,1},\ldots,CQI_K\cdot C_{CDI,K}]$$

The user equipment of Embodiment 1 of the invention is used in a coordinated multi-point system. In the coordinated multi-point system, the number of base stations joining coor dination is K, and the source codebook is expressed by the following equation.

$$C=\{C_i\}, i=1,\ldots,2^N$$

In addition, $C_i=[C_{i,1},\ldots,C_{i,k}]$.

Figure 2:
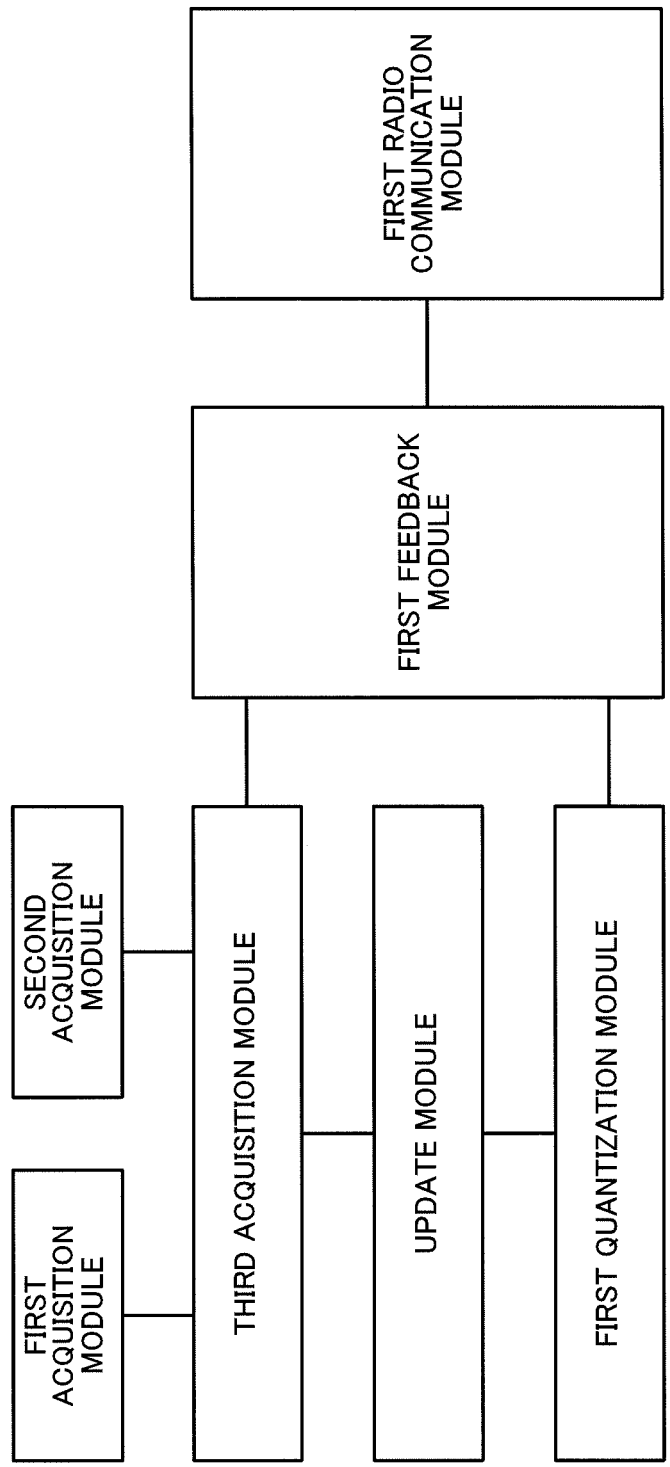
FIG. 2 is a structure diagram of a user equipment of Embodiment 1 of the invention.

As shown in FIG. 2, the user equipment includes a first radio communication module, a first acquisition module to acquire small-scale channel state information $H'=[H'_1, H'_2,\ldots,H'_K]$ between the user equipment and all base stations joining coordination, a second acquisition module to acquire large-scale channel state information $l_i$ ($i=1,\ldots,K$) between the user equipment and each of the base stations joining coordination, a third acquisition module to acquire a CQI ($CQI_i=l_i\cdot|H'|$, $i=1,\ldots K$) between the user equipment and each of the base stations joining coordination based on the small-scale channel state information and the large-scale channel state information, an update module to update the source codebook C using the CQI between the user equipment and each of the base stations joining coordination to acquire an updated codebook $\tilde{C}$, a first quantization module to perform quantization processing using the updated codebook to acquire CDI, and a first feedback module to transmit the CDI and the CQI associated with each of the base stations joining coordination to a base station as feedback using the first radio communication module to provide for channel reconstruction in the base station, and the updated codebook $\tilde{C}$ is expressed by the following equation.

$$\tilde{C}=\{\tilde{C}_i\}=\{[CQI_1\cdot C_{i,1},\ldots,CQI_K\cdot C_{i,K}]\}, i=1,\ldots,2^N$$

In the specific Embodiment of the invention, the above-mentioned quantization module is capable of calculating the CDI using following schemes.

Scheme 1 The small-scale channel state information is a subject of quantization.

In the case of scheme 1, the quantization module performs quantization processing on the small-scale channel state information H' using the updated codebook to acquire the CDI.

$$CDI = \arg\max_{1\le j\le 2^N} \frac{|\tilde{C}_j \cdot H'^H|}{|\tilde{C}_j|\cdot|H'^H|}$$

The channel reconstructed by the base station is expressed by the following equation.

$$\hat{H}=[CQI_1\cdot C_{CDI,1},\ldots,CQI_K\cdot C_{CDI,K}]$$

Scheme 2 The complete channel state information is a subject of quantization.

In the case of scheme 2, the quantization module performs quantization processing on the complete channel state information $H=[l_1H'_1, l_2H'_2,\ldots,l_KH'_K]$ using the updated codebook to acquire the CDI.

$$CDI = \arg\max_{1\le j\le 2^N} \frac{|\tilde{C}_j \cdot H^H|}{|\tilde{C}_j|\cdot|H^H|}$$

The channel reconstructed by the base station is expressed by the following equation.

$$\hat{H}=[CQI_1\cdot C_{CDI,1},\ldots,CQI_K\cdot C_{CDI,K}]$$

As described in the background art portion also, in the conventional techniques exists the channel state information feedback method for performing quantization independently for each cell based on a small codebook. Embodiment 2 of the invention is obtained by modifying the aforementioned method. The codebook is assumed as described below.

$$C'=\{C'_i\}, i=1,\ldots,2^N$$

In addition, $C'_i$: ith codeword in the codebook;
N: the number of bits transmitted as feedback.

The channel state information feedback method of Embodiment 2 of the invention includes following steps 31 to 38.

In step 31, the user equipment acquires small-scale channel state information $H'=[H'_1, H'_2,\ldots,H'_K]$ between the user equipment and all base stations joining coordination.

In step 32, the user equipment acquires large-scale channel state information $l_i$($i=1,\ldots,K$) between the user equipment and each of the base stations joining coordination.

In step 33, the user equipment acquires a CQI ($CQI_i=l_i\cdot|H'|$, $i=1,\ldots,K$) between the user equipment and each of the base stations joining coordination.

In step 34, the user equipment performs quantization on the channel state information of each of the base stations joining coordination using the small codebook C' to acquire CDI information.

The rule of quantization is $$CDI_i = \arg\max_{1\le j\le 2^N} \frac{|C'_j \cdot H'^H_i|}{|C'_j|\cdot|H'^H_i|}, i=1,\ldots,K$$

or $$CDI_i = \arg\max_{1\le j\le 2^N} \frac{|C'_j \cdot H^H_i|}{|C'_j|\cdot|H^H_i|}, i=1,\ldots,K.$$

In addition, $H=[l_1H'_1, l_2H'_2,\ldots l_KH'_K]$.

Quantization results by both rules are matched.

In step 35, the user equipment calculates multi-base station phase information G.

$$G=[g_1,\ldots g_k]$$

In addition, $$g_i = \frac{C'_{CDI_i} \cdot H^H_i}{|C'_{CDI_i} \cdot H^H_i|}, i=1,\ldots,K$$

In step 36, the user equipment calculates inter-base station difference phase information G', based on the multi-base station phase information G.

$$G'=\{g'_i\}, i=1,\ldots,K, i\ne x$$

In addition, $g'_i/g_x$, $i=1,\ldots,K$, and $g_x$ is one element in the multi-base station phase information G and for example, is $g_1$, $g_2$ or the like.

In step 37, the user equipment performs quantization on the inter-base station difference phase information G' using a phase information quantization codebook D to acquire IPI.

$$IPI_i = \arg\max_{1\le j\le 2^M} \frac{|g'_i \cdot D^H_j|}{|g'_i|\cdot|D^H_j|}, i=1,\ldots,K, i\ne\chi$$

D is a codebook to perform quantization on the inter-base station difference phase information, and is expressed by the following equation.

$$D = \{D_j\}, j = 1, \ldots, 2^M$$

$$D_j = \exp\left(\frac{sqrt(-1)^* j 2\pi}{2^M}\right), j = 1, \ldots, 2^M$$

is a phase angle to quantize, and M is the number of bits required for quantization of the phase angle.

In step 38, the user equipment transmits the acquired IPI, the CQI associated with each of the base stations joining coordination and the CDI as feedback to provide for multi-point channel reconstruction in the base station. A multi-point channel to reconstruct is expressed by the following equation.

$$\hat{H}=[\ldots, D_{IPI_{x-1}} \cdot CQI_{x-1} \cdot C_{CDI_{x-1}}, CQI_x \cdot C_{CDI_x}, D_{IPI_{x+1}} \cdot CQI_{x+1} \cdot C_{CDI_{x+1}}, \ldots]$$

In x=1, a multi-point channel to reconstruct is expressed by the following equation.

$$\hat{H}=[CQI_1 \cdot C_{CDI_1}, D_{IPI_2} \cdot CQI_2 C_{CDI_2}, \ldots, D_{IPI_k} \cdot CQI_k, C_{CDI_k}]$$

In x=2, a multi-point channel to reconstruct is expressed by the following equation.

$$\hat{H}=[D_{IPI_1} \cdot CQI_1 \cdot C_{CDI_1}, CQI_2 \cdot C_{CDI_2}, D_{IPI_3} \cdot CQI_3, \ldots, D_{IPI_k} \cdot CQI_k \cdot C_{CDI_k}]$$

In x=k, a multi-point channel to reconstruct is expressed by the following equation.

$$\hat{H}=[D_{IPI_1} \cdot CQI_1 \cdot C_{CDI_1}, \ldots, D_{IPI_{k-1}} \cdot CQI_{k-1} \cdot C_{CDI_{k-1}}, CQI_k \cdot C_{CDI_k}]$$

...

A user equipment of Embodiment 2 of the invention includes a first radio communication module, first acquisition module, second acquisition module, third acquisition module, second quantization module, fourth acquisition module, fifth acquisition module, third quantization module and second feedback module.

The first acquisition module acquires small-scale channel state information $H'=[H'_1, H'_2, \ldots, H'_K]$ between the user equipment and all base stations joining coordination.

The second acquisition module acquires large-scale channel state information $l_i$ (i=1, ..., K) between the user equipment and each of the base stations joining coordination.

The third acquisition module acquires a CQI between the user equipment and each of the base stations joining coordination, based on the small-scale channel state information and the large-scale channel state information.

$$CQI_i = l_i \cdot |H'|, i=1, \ldots, K$$

The second quantization module performs quantization on the channel state information of each of the base stations joining coordination using the small codebook C' to acquire CDI information.

The rule of quantization is $$CDI_i = \arg\max_{1 \leq j \leq 2^N} \frac{|C'_j \cdot H_i^H|}{|C'_j| \cdot |H_i^H|}, i = 1, \ldots, K$$

or $$CDI_i = \arg\max_{1 \leq j \leq 2^N} \frac{|C'_j \cdot H_i^H|}{|C'_j| \cdot |H_i^H|}, i = 1, \ldots, K.$$

In addition, $H=[l_1 H'_1, l_2 H'_2, \ldots, l_K H'_K]$.
Quantization results by both rules are matched.

The fourth acquisition module calculates multi-base station phase information G.

$$G=[g_1, \ldots, g_K]$$

In addition, $$g_i = C'_{CDI_9} \cdot H_i^H, i=1, \ldots, K$$

The fifth acquisition module calculates inter-base station difference phase information G' based on multi-base station phase information G.

$$G'=\{g'_i\}, i=1, \ldots, K, i \neq x$$

In addition, $g'_i = g_i / g_x$, i=1, ..., K, and $g_x$ is one element in the multi-base station phase information G and for example, is $g_1$, $g_2$ or the like.

The third quantization module performs quantization on the inter-base station difference phase information G' using a phase information quantization codebook D to acquire K−1 IPIs.

$$IPI_i = \arg\max_{1 \leq j \leq 2^M} \frac{|g'_i \cdot D_j^H|}{|g'_i| \cdot |D_j^H|}, i = 1, \ldots, K, i \neq \chi$$

D is a codebook to perform quantization on the inter-base station difference phase information, and is expressed by the following equation.

$$D = \{D_j\}, j = 1, \ldots, 2^M$$

$$D_j = \exp\left(\frac{sqrt(-1)^* j 2\pi}{2^M}\right), j = 1, \ldots, 2^M$$

is a phase angle to quantize, and M is the number of bits required for quantization of the phase angle.

The second feedback module transmits the acquired IPI, the CQI associated with each of the base stations joining coordination and the CDI as feedback using the first radio communication module to provide for multi-point channel reconstruction in the base station. A multi-point channel to reconstruct is expressed by the following equation.

$$\hat{H}=[\ldots, D_{IPI_{x-1}} \cdot CQI_{x-1} \cdot C_{CDI_{x-1}}, CQI_x \cdot C_{CDI_x}, D_{IPI_{x+1}} \cdot CQI_{x+1} \cdot C_{CDI_{x+1}}, \ldots].$$

In x=1, a multi-point channel to reconstruct is expressed by the following equation.

$$\hat{H}=[CQI_1 \cdot C_{CDI_1}, D_{IPI_2} \cdot CQI_2, C_{CDI_2}, \ldots, D_{IPI_k} \cdot CQI_k, C_{CDI_k}]$$

In x=2, a multi-point channel to reconstruct is expressed by the following equation.

$$\hat{H}=[D_{IPI_1} \cdot CQI_1 \cdot C_{CDI_1}, CQI_2 \cdot C_{CDI_2}, D_{IPI_3} \cdot CQI_3 \cdot C_{CDI_3}, \ldots, D_{IPI_k} \cdot CQI_k \cdot C_{CDI_k}]$$

...

In x=k, a multi-point channel to reconstruct is expressed by the following equation.

$$\hat{H}=[D_{IPI_1} \cdot CQI_1 \cdot C_{CDI_1}, \ldots, D_{IPI_{k-1}} \cdot CQI_{k-1} \cdot C_{CDI_{k-1}}, CQI_k \cdot C_{CDI_k}]$$

Naturally, $g_x$ can specifically be determined beforehand between the base station and the user equipment side.

In the invention, in the case of performing feedback using the large codebook, the quantization processing is performed using the CQI-updated codebook to acquire the CDI, and throughput of the user is thereby increased, without increasing feedback overhead. In the case of performing feedback using the small codebook, feedback is performed using the difference phase, and feedback overhead is thereby reduced without decreasing throughput of the user. On the whole, two kinds of methods both improve the rate of utilization of feedback information.

To verify improvements in the rate of utilization of feedback information, simulations and analysis was performed on the conventional technical ideas and the technical ideas of the invention. The setting of simulation was as described below. It is assumed that a user performs coordinated multi-point transmission, the number of coordinated base stations is "3", and that the other simulation parameters were as follows:

Carrier frequency: 2 GHz
Arrangement of cells: 19 hexagonal cells exist, and each cell has 3 sectors.
Antenna of the base station: 70 degrees Sector beaming slope 15-degree slope
Distance between base stations: 500 m
Distance correlation path loss: 128.1+37.6 log 10(r) dB
Passage loss: 20 dB
Shadowing attenuation standard difference: 8 dB
Shadowing correlation degree: Inter-base station: 0.5/Intra-cell: 1.0
Inter-antenna spatial correlation degree: No correlation
The number of antennas of the base station/user equipment: 4/1
CQI feedback: Ideal
Modulation coding plan set: QPSK (R=1/8, 1/6, 1/5, 1/4, 1/3, 1/2, 3/5, 2/3, 3/4, 5/6) 16QAM (R=1/2, 3/5, 2/3, 3/4, 5/6) 64QAM (R=3/5, 2/3, 3/4, 4/5)

Simulation results of Embodiment 1 of the invention are shown in the following Table. As compared with corresponding conventional techniques, based on the premise that the feedback amount is not changed, two kinds of technical ideas according to Embodiment 1 show improvements in throughput to some extent, and it is understood that system throughput performance gain by a unit feedback amount is increased.

| THE NUMBER OF CODEBOOK BITS | | CONVENTIONAL TECHNICAL IDEA 1 | CONVENTIONAL TECHNICAL IDEA 2 | SMALL-SCALE CHANNEL STATE INFORMATION QUANTIZATION OF EMBODIMENT 1 | COMPLETE CHANNEL STATE INFORMATION QUANTIZATION OF EMBODIMENT 1 |
|---|---|---|---|---|---|
| 4 | AVERAGE CAPACITY (bps/Hz) | 0.97 | 1.52 | 1.52 | 1.55 |
|   | CDI FEEDBACK BITS | 4bits | 4bits | 4bits | 4bits |
|   | CQI FEEDBACK | 3 CQIs | 3 CQIs | 3 CQIs | 3 CQIs |
| 6 | AVERAGE CAPACITY (bps/Hz) | 1.00 | 1.54 | 1.54 | 1.57 |
|   | CDI FEEDBACK BITS | 6bits | 6bits | 6bits | 6bits |
|   | CQI FEEDBACK | 3 CQIs | 3 CQIs | 3 CQIs | 3 CQIs |

Simulation results of Embodiment 2 of the invention are shown in the following Table. In the technical idea of Embodiment 2, as compared with corresponding conventional techniques, in the case that average throughput is not changed, the feedback amount of information is reduced, and it is understood that system throughput performance gain by a unit feedback amount is increased.

| | | CONVENTIONAL TECHNICAL IDEA 3 | TECHNICAL IDEA 3 OF THE INVENTION |
|---|---|---|---|
| 4-BIT CODEBOOK + 4-BIT PHASE INFORMATION QUANTIZATION CODEBOOK | AVERAGE CAPACITY (bps/Hz) | 1.60 | 1.60 |
|   | CDI FEEDBACK BITS | 3 × 4 = 12bits | 3 × 4 = 12bits |
|   | PHASE FEEDBACK BITS | 3 × 4 = 12bits | 2 × 4 = 8bits |
|   | CQI FEEDBACK | 3 CQIs | 3 CQIs |
| 6-BIT CODEBOOK + 4-BIT PHASE INFORMATION QUANTIZATION CODEBOOK | AVERAGE CAPACITY (bps/Hz) | 1.64 | 1.64 |
|   | CDI FEEDBACK BITS | 3 × 6 = 18bits | 3 × 6 = 18bits |
|   | PHASE FEEDBACK BITS | 3 × 4 = 12bits | 2 × 4 = 8bits |
|   | CQI FEEDBACK | 3 CQIs | 3 CQIs |

For small-scale channel state information quantization in Embodiment 1, since update of the codebook is performed, the large-scale channel state information is considered in the updated codebook. The rule of quantization is expressed by the following equation.

$$CDI_{P1} = \arg\max_j \frac{|\tilde{C}_j \cdot H'^H|}{|\tilde{C}_j| \cdot |H'^H|}$$

Meanwhile, in conventional method 2, the large-scale channel state information is considered in the channel. The rule of quantization is expressed by the following equation.

$$CDI_{C2} = \arg\max_j \frac{|C_j \cdot H^H|}{|C_j| \cdot |H^H|}$$

$$\frac{|\tilde{C}_j \cdot H'^H|}{|\tilde{C}_j| \cdot |H'^H|} = \frac{\left|\sum_{i=1}^{K} CQI_i \cdot C_{j,i} \cdot H'_i\right|}{\sum_{i=1}^{K} CQI_i \cdot |C_{j,i}| \cdot |H'^H_i|}$$

$$= \frac{\left|\sum_{i=1}^{K} C_{j,i} \cdot CQI_i \cdot H'_i\right|}{\sum_{i=1}^{K} |C_{j,i}| \cdot CQI_i \cdot |H'^H_i|}$$

$$= \frac{|C_j \cdot H^H|}{|C_j| \cdot |H^H|}$$

From such a derivative process, the equation of $CDI_{P1} = CDI_{C2}$ holds. In other words, in technical idea 1 and conventional method 2, the same performance is acquired, and thus, throughput is increased as compared with conventional method 1.

In the third method of the conventional techniques, phase information of a plurality of cells is all adjusted to ideal channel phase information. In contrast thereto, in the method of Embodiment 2, assuming that the channel information to quantize in the conventional method is

Ĥ, the quantization channel by corresponding technical idea 3 can be expressed by the following equation.

$$\hat{H}_{pro} = \hat{H} \cdot e^{j\alpha}$$

In addition, α is an angle of phase rotation.

From analysis of the angle of capacity, it is understood that the capacity acquired by the method of Embodiment 2 is as follows:

$$C_{pro} = \log_2\left(1 + \frac{|\hat{H}_{pro}|}{N_0 + I}\right)$$

Meanwhile, the capacity acquired by three kinds of methods of the conventional techniques is expressed by the following equation.

$$C = \log_2\left(1 + \frac{|\hat{H}|}{N_0 + I}\right)$$

In addition, I represents interference of another cell, and $N_o$ represents noise power.

However, since it is understood from $$C_{pro} = \log_2\left(1 + \frac{|\hat{H}_{pro}|}{N_0 + I}\right)$$

$$= \log_2\left(1 + \frac{|\hat{H} \cdot e^{j\alpha}|}{N_0 + I}\right)$$

$$= \log_2\left(1 + \frac{|\hat{H}|}{N_0 + I}\right)$$

$$= C,$$

in the method of Embodiment 2, it is possible to acquire the same capacity performance as conventional method 3, and the feedback amount is reduced.

The above-mentioned descriptions are only preferred practice schemes of the present invention. In addition, improvements and modifications will be conceived to some extent based on the premise of departing from the principle of the invention by a general engineer of the field. However, it is understood that the improvements and modifications are within the protective scope of the invention.

The invention claimed is:

1. A channel state information feedback method used in a coordinated multi-point system in which the number of base stations joining coordination is represented by K and a source codebook is expressed by C={$C_i$} wherein i=1, . . . , $2^N$, $C_i$=[$C_{i,1}$, . . . , $C_{i,K}$], and N is the number of bits transmitted as feedback, the method comprising:
   a user equipment acquiring small-scale channel state information H'=[$H'_1$, $H'_2$, . . . , $H'_K$] between the user equipment and all base stations joining coordination;
   the user equipment acquiring large-scale channel state information $l_i$, wherein i=1, . . . , K between the user equipment and each of the base stations joining coordination;
   the user equipment acquiring a Channel Quality Information (CQI), wherein $CQI_i=l_i\cdot|H'|$, wherein i=1, . . . , K, and wherein · represents a dot product, between the user equipment and each of the base stations joining coordination, based on the small-scale channel state information and the large-scale channel state information;
   the user equipment updating the source codebook C using the acquired CQI to acquire an updated codebook $\tilde{C}$;
   the user equipment performing quantization processing using the updated codebook to acquire Channel Direction Information (CDI); and
   the user equipment transmitting the CDI and the CQI associated with each of the base stations joining coordination to a base station as feedback to provide for channel reconstruction in the base station.

2. The channel state information feedback method according to claim 1, wherein the updated codebook $\tilde{C}$ is expressed by the following equation:

$$\tilde{C}=\{\tilde{C}_i\}=\{[CQI_1 \cdot C_{i,1}, \ldots, CQI_K \cdot C_{i,K}]\}, i=1,\ldots,2^N.$$

3. The channel state information feedback method according to claim 2, wherein the user equipment performing quantization processing using the updated codebook to acquire CDI comprises the user equipment performing quantization processing on the H' using the updated codebook to acquire the CDI, or the user equipment performing quantization processing on complete channel state information H=[$l_1H'_1$, $l_2H'_2$, ..., $l_KH'_K$] using the updated codebook to acquire the CDI.

4. A user equipment used in a coordinated multi-point system in which the number of base stations joining coordination is represented by K and a source codebook is expressed by C={$C_i$} wherein i=1, ..., $2^N$, $C_i$=[$C_{i,1}$, ..., $C_{i,K}$], and N is the number of bits transmitted as feedback, the user equipment comprising:

a first radio communication module;

a first acquisition module configured to acquire small-scale channel state information H'=[$H'_1$,$H'_2$,...,$H'_K$] between the user equipment and all base stations joining coordination;

a second acquisition module configured to acquire large-scale channel state information $l_i$, wherein i=1, ..., K between the user equipment and each of the base stations joining coordination;

a third acquisition module configured to acquire a Channel Quality Information (CQI), wherein $CQI_i$=$l_i$·|H'|, wherein i=1, ..., K between the user equipment and each of the base stations joining coordination, and wherein · represents a dot product;

an update module configured to update the source codebook C using the acquired CQI to acquire an updated codebook $\tilde{C}$;

a first quantization module configured to perform quantization processing using the updated codebook to acquire Channel Direction Information (CDI); and a first feedback module configured to transmit the CDI and the CQI associated with each of the base stations joining coordination to a base station as feedback using the first radio communication module to provide for channel reconstruction in the base station.

5. The user equipment according to claim 4, wherein the updated codebook $\tilde{C}$ is expressed by the following equation:

$$\tilde{C}=\{\tilde{C}_i\}=\{[CQI_1 \cdot C_{i,1},\ldots,CQI_K \cdot C_{i,K}]\}, i=1,\ldots,2^N.$$

6. The user equipment according to claim 5, wherein the quantization module performs quantization processing on the H' using the updated codebook to acquire the CDI, or performs quantization processing on complete channel state information H=[$l_1H'_1$, $l_2H'_2$, ..., $l_KH'_K$] using the updated codebook to acquire the CDI.

* * * * *